(12) United States Patent
O'Callaghan et al.

(10) Patent No.: US 12,474,201 B2
(45) Date of Patent: Nov. 18, 2025

(54) ADAPTOR FOR REMOTE EQUIPMENT MONITORING DEVICE

(71) Applicant: Cornell Pump Company LLC, Clackamas, OR (US)

(72) Inventors: Colin O'Callaghan, Portland, OR (US); Adam Lindeman, Oregon City, OR (US); William James Warren, Boring, OR (US)

(73) Assignee: Cornell Pump Company LLC, Clackamas, OR (US)

( * ) Notice: Subject to any disclaimer, the term of this patent is extended or adjusted under 35 U.S.C. 154(b) by 396 days.

(21) Appl. No.: 18/006,643

(22) PCT Filed: Jul. 7, 2021

(86) PCT No.: PCT/US2021/040641
§ 371 (c)(1),
(2) Date: Jan. 24, 2023

(87) PCT Pub. No.: WO2022/026138
PCT Pub. Date: Feb. 3, 2022

(65) Prior Publication Data
US 2023/0288246 A1 Sep. 14, 2023

Related U.S. Application Data

(60) Provisional application No. 63/058,880, filed on Jul. 30, 2020.

(51) Int. Cl.
*G01H 1/00* (2006.01)
*G01D 11/30* (2006.01)
(Continued)

(52) U.S. Cl.
CPC .............. *G01H 1/003* (2013.01); *G01D 11/30* (2013.01); *G01K 1/143* (2013.01)

(58) Field of Classification Search
CPC ........ G01H 1/003; G01D 11/30; G01K 1/143; G01K 1/16; G01K 1/14
(Continued)

(56) References Cited

U.S. PATENT DOCUMENTS 9,811,984 B2 11/2017 Decook et al.
2002/0180430 A1 12/2002 Kang
(Continued)

FOREIGN PATENT DOCUMENTS

| CN | 104515542 A | 4/2015 |
| CN | 208419865 U | 1/2019 |

(Continued)

OTHER PUBLICATIONS

"Mounting of magnet and zylinder sensors," Baumer Electric AG, accessed Apr. 21, 2020, <https://www.baumer.com/ch/en/service-support/know-how/setup-installation/mounting-of-magnet-and-zylinder-sensors/a/Know-how_Mounting_Magnet-cylinder-sensors>.

(Continued)

*Primary Examiner* — Laura Martin
*Assistant Examiner* — Anthony W Megna Fuentes
(74) *Attorney, Agent, or Firm* — Fish & Richardson P.C.

(57) ABSTRACT

A magnetic adaptor is provided for attaching a monitoring device to monitored equipment. A mounting plate of the adaptor includes a front surface, a rear surface, and a recess in the rear surface. A magnet is secured within the recess. The mounting plate also includes threaded mounting holes arranged in a hole pattern that corresponds to a bolt pattern of the monitoring device. The threaded mounting holes are configured to receive threaded bolts from the monitoring device to secure the front surface against the monitoring device. The magnet is configured to adhere to the monitored equipment and cause at least a portion the rear surface to
(Continued)

contact the monitored equipment. The adaptor transfers vibration and/or thermal energy from the monitored equipment to the monitoring device.

15 Claims, 8 Drawing Sheets

(51) Int. Cl.
  *G01K 1/14* (2021.01)
  *G01K 1/143* (2021.01)
  *G01K 1/16* (2006.01)

(58) Field of Classification Search
  USPC .......................................................... 73/649
  See application file for complete search history.

(56) References Cited

U.S. PATENT DOCUMENTS

2004/0232291 A1* 11/2004 Carnevali .............. F16M 13/00
                                                                  248/206.5
2009/0250575 A1* 10/2009 Fullerton .................. G09F 7/04
                                                                  248/206.5

FOREIGN PATENT DOCUMENTS

| CN | 109866133 A | 6/2019 |
|---|---|---|
| CN | 110221426 A | 9/2019 |
| CN | 209676101 U | 11/2019 |
| CN | 110554073 A | 12/2019 |
| EP | 3388798 A1 | 10/2018 |
| JP | 2007081028 A | 3/2007 |
| JP | 2018112477 A | 7/2018 |
| JP | 2019027875 A | 2/2019 |
| JP | 2019027967 A | 2/2019 |
| KR | 20150073369 A | 7/2015 |
| TW | 201043928 A | 12/2010 |
| WO | 2018094273 A1 | 5/2018 |
| WO | 2019117171 A1 | 6/2019 |

OTHER PUBLICATIONS

"Rosemount 8711 Wafer Magnetic Flow Meter Sensors," Emerson Electric Co., accessed Apr. 21, 2020, <https://www.emerson.com/en-us/catalog/rosemount-8711?fetchFacets=true#facet:&facetLimit:&productBeginIndex:0&orderBy:&pageView:list&minPrice:&maxPrice:&pageSize:&>.
International Search Report and Written Opinion issued in corresponding International Application No. PCT/US2021/040641, mailed on Oct. 15, 2021, 15 pages.
International Preliminary Report on Patentability in International Appln. No. PCT/US2021/040641, mailed on Feb. 9, 2023, 11 pages.

* cited by examiner

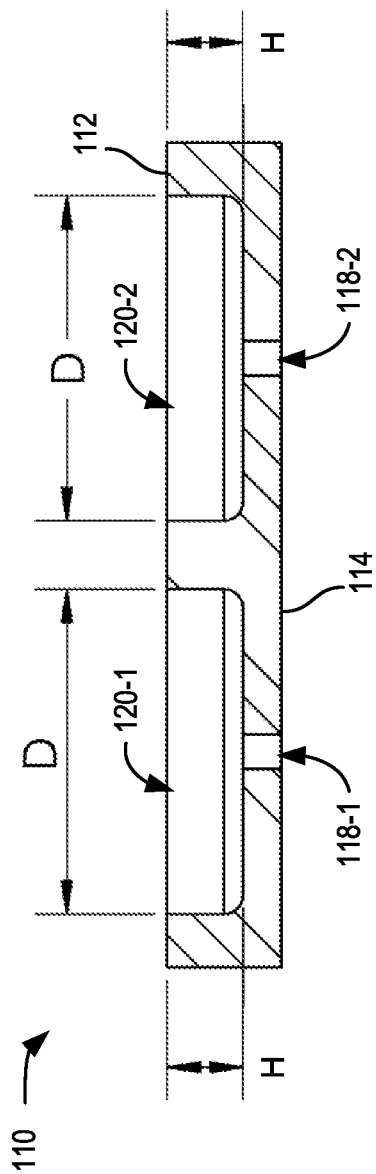
FIG. 6
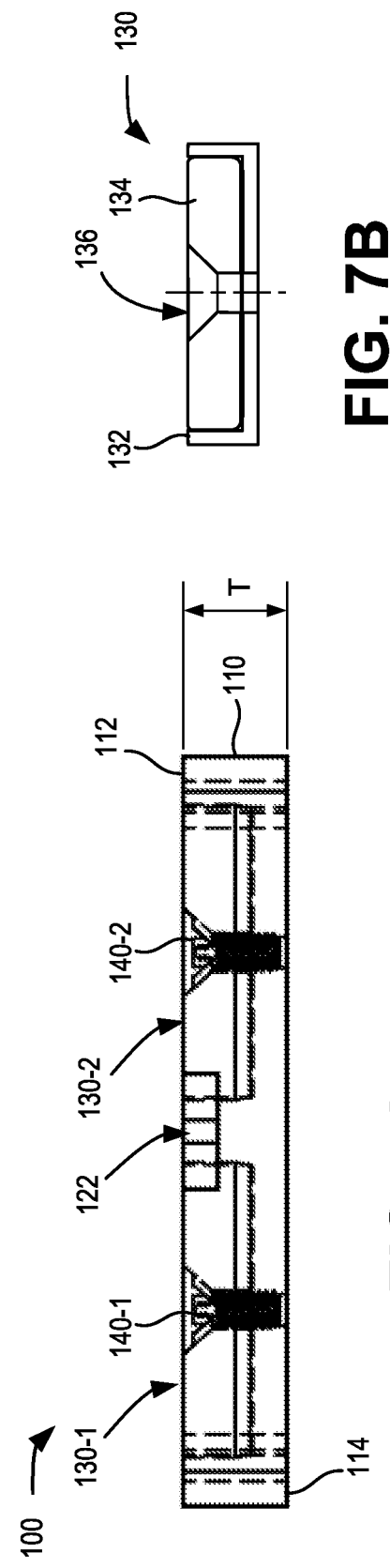
FIG. 7A
FIG. 7B

ADAPTOR FOR REMOTE EQUIPMENT MONITORING DEVICE

CROSS-REFERENCE TO RELATED APPLICATIONS

This application claims the benefit under 35 U.S.C. § 371 of International Application No. PCT/US2021/040641, filed Jul. 7, 2021, which claims priority under 35 U.S.C. § 119 based on U.S. Provisional Patent Application No. 63/058,880, filed Jul. 30, 2020, the disclosures of which are both hereby incorporated by reference herein.

BACKGROUND OF THE INVENTION

Equipment monitoring systems give pump users the ability to monitor pump parameters remotely. In some instances, a monitoring device may be provided as a single unit that can be attached to an outside surface of the pump and detect pump characteristics, such as vibration, temperature, and pump location.

BRIEF DESCRIPTION OF THE DRAWINGS

FIG. 6 is a side cross-section view of the mounting plate of FIG. 1;

FIG. 7A is an side view of the magnetic adaptor of FIG. 1;

FIG. 7B is a side cross-section view of a magnetic disk of FIG. 1;

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

Monitoring devices configured for direct physical attachment (e.g., as a single unit) to pump equipment provide a convenient way to provide monitoring data for new and retrofit pump applications. The monitoring device may support monitoring of internal vibration, temperature, and/or location sensors, along with data uploading over a wireless network. In one implementation, the monitoring device may be an industrial internet-of-things (IIoT) device. A mechanical coupling between the pump equipment (e.g., the pump frame) and the monitoring device provides heat transfer (e.g., for temperature sensing) and mechanical contact (e.g., for vibration sensing).

Previously, monitoring devices have been mounted to pumps using mechanical fasteners, such as screws, which require tapped holes in the pump frame. Some types of equipment that would benefit from having a monitoring device do not have convenient locations to drill and tap the necessary mounting holes. Drilling and tapping the holes requires precise alignment and can be a difficult field operation. If drilling is done improperly, there is the possibility of damage to the pump equipment. Furthermore, the threaded mounting holes can be stripped, which requires repair.

According to implementations described herein, a magnetic adaptor is provided to securely mount a monitoring device to a pump frame. The adaptor includes a metal (e.g., stainless steel) plate with one or more pockets machined into one side for mounting magnets. On the side opposite from the magnets, the plate includes mounting holes for mounting the plate to a monitoring device (e.g., an IIoT device). The mounting plate can be altered to conform to a flat or curved pump frame surface. The monitoring device/adaptor can then be magnetically attached to any equipment that has ferrous metal. The magnet(s) have sufficient holding strength to withstand any vibration produced by the pump equipment to which it is mounted without slipping.

The magnetic adaptor overcomes disadvantages of the previous mounting methods in that there are no threaded holes in the pump frame to drill or potentially strip. The magnetic adaptor also provides more options for mounting locations than with the previous mounting methods, since little to no preparation or modification work is required of the pump equipment prior to mounting. Furthermore, no extra equipment is required to install the monitoring device when configured with the magnetic adaptor.

Figure 1:
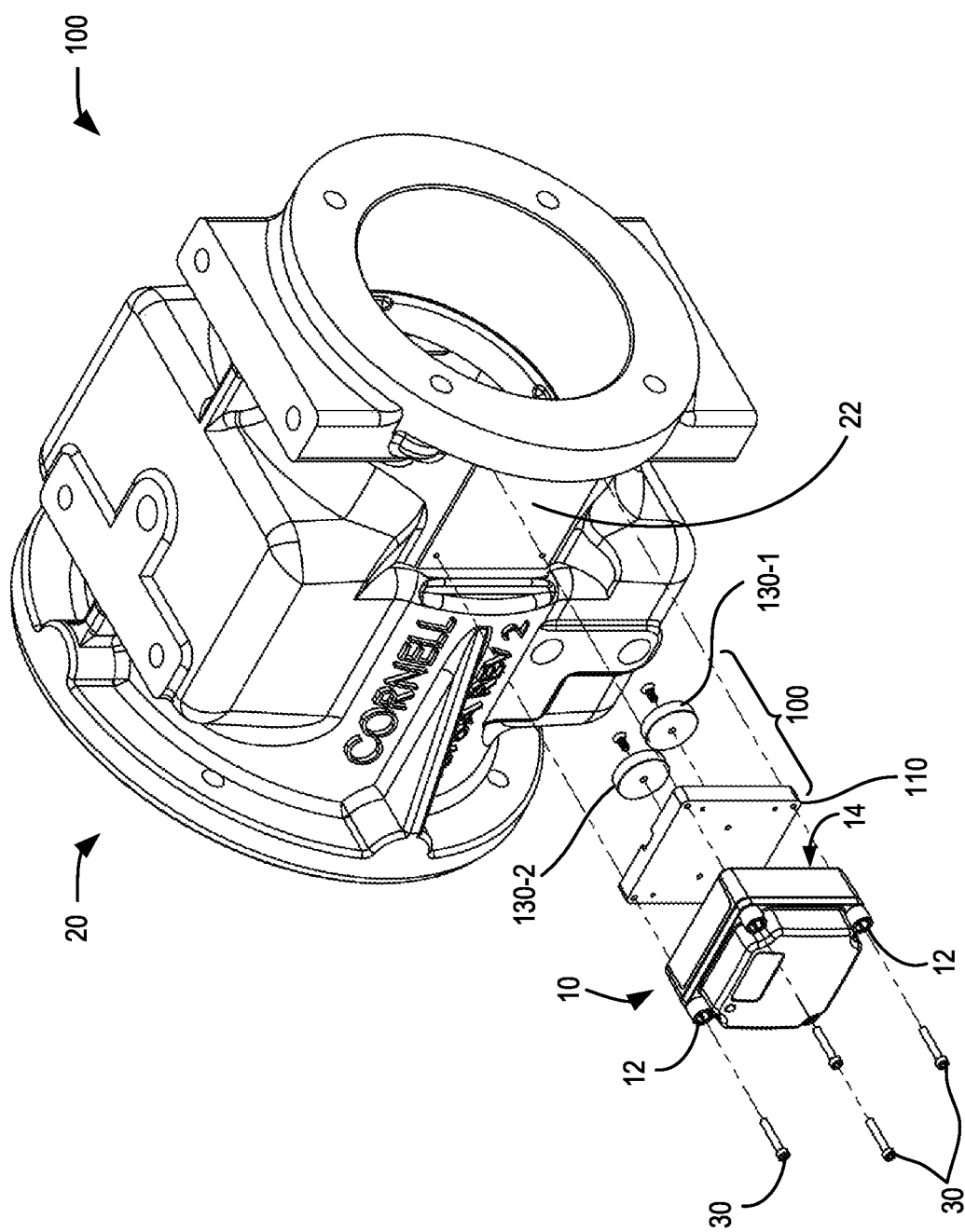
FIG. 1 is a diagram of an assembly view of a monitoring device with a magnetic adaptor, according to an implementation.
Figure 2:
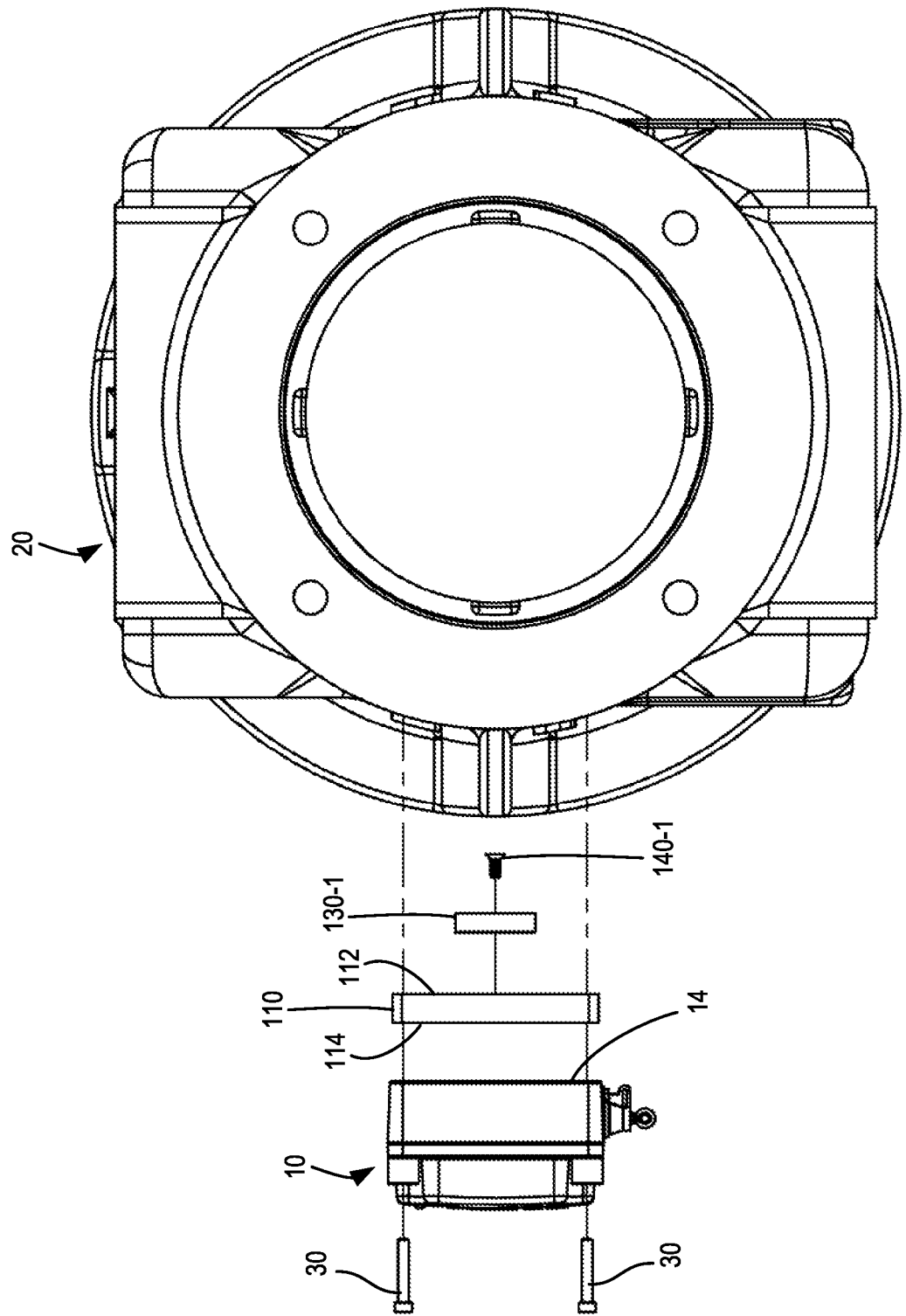
FIG. 2 is a schematic exploded view of the monitoring device with a magnetic adaptor of FIG. 1.

FIG. 1 is a diagram of an assembly view of a monitoring device 10 with a magnetic adaptor 100, according to an implementation described herein. FIG. 2 is a schematic exploded view of monitoring device 10 and magnetic adaptor 100. Referring collectively to FIGS. 1 and 2, monitoring device 10 may be attached to magnetic adaptor 100 that connects monitoring device 10 to a pump frame 20.

Monitoring device 10 may be configured for physical attachment, as a single unit, to an outside surface of pump frame 20. Monitoring device 10 may include an Internet of Things device (e.g., an IIoT) device, a Machine Type Communication (MTC) device, a machine-to-machine (M2M) device, an enhanced MTC device (eMTC) (also known as Cat-M1), an end node employing Low Power Wide Area (LPWA) technology such as Narrow Band (NB) IoT (NB-IoT) technology, or some other type of wireless end node. According to various exemplary embodiments, monitoring device 10 may include hardware, such as a processor, application-specific integrated circuit (ASIC), a field-programmable gate array (FPGA), or a combination of hardware and software (e.g., a processor executing software) to execute various types of functions. As described further herein, monitoring device 10 may include calibrated sensors to collect vibration, temperature, and/or other pump data, and forward the collected data via a wireless interface (not shown) for access by users. Monitoring device 10 may include a sealed casing to protect against dust or spray. Monitoring device 10 may also include an internal battery that supports monitoring of internal vibration, temperature, and/or location sensors, along with data uploading over a wireless network. In another implementation, monitoring device 10 may also include an external power port to provide continuous power and support additional monitoring of external sensors (e.g., flow sensors, other vibration sensor, other temperature sensors, etc.) through hard-wired sensor ports of monitoring device 10.

Pump frame 20 (also referred to as "monitored equipment") may include a housing for a pump, engine, electric motor, a bearing frame, or any other piece of equipment (e.g., rotating equipment) that a user wishes to monitor using vibration, temperature, and other sensors. According to implementations described herein, pump frame 20 may include a ferrous metal, such as steel, stainless steel, carbon steel, cast iron, etc. In some implementations, pump frame 20 may include a mounting surface 22 onto which monitoring device 10 may be attached. Mounting surface 22 may be a flat, machined surface located, for example, over the bearing housing of pump frame 20. In other implementations, pump frame 20 may not include a dedicated mounting surface.

Figure 3:
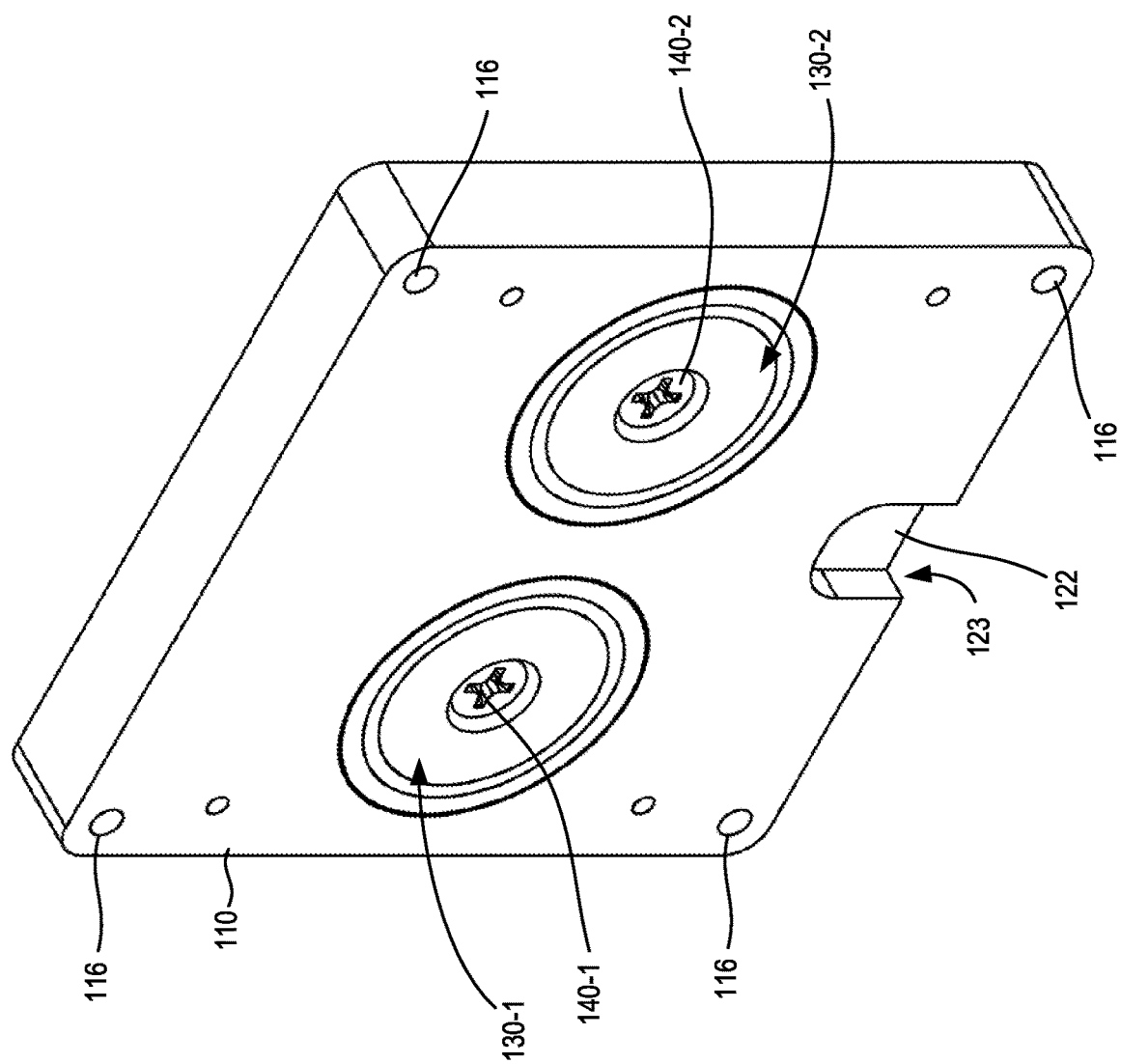
FIG. 3 is a rear perspective view of the magnetic adaptor of FIG. 1.
Figure 4:
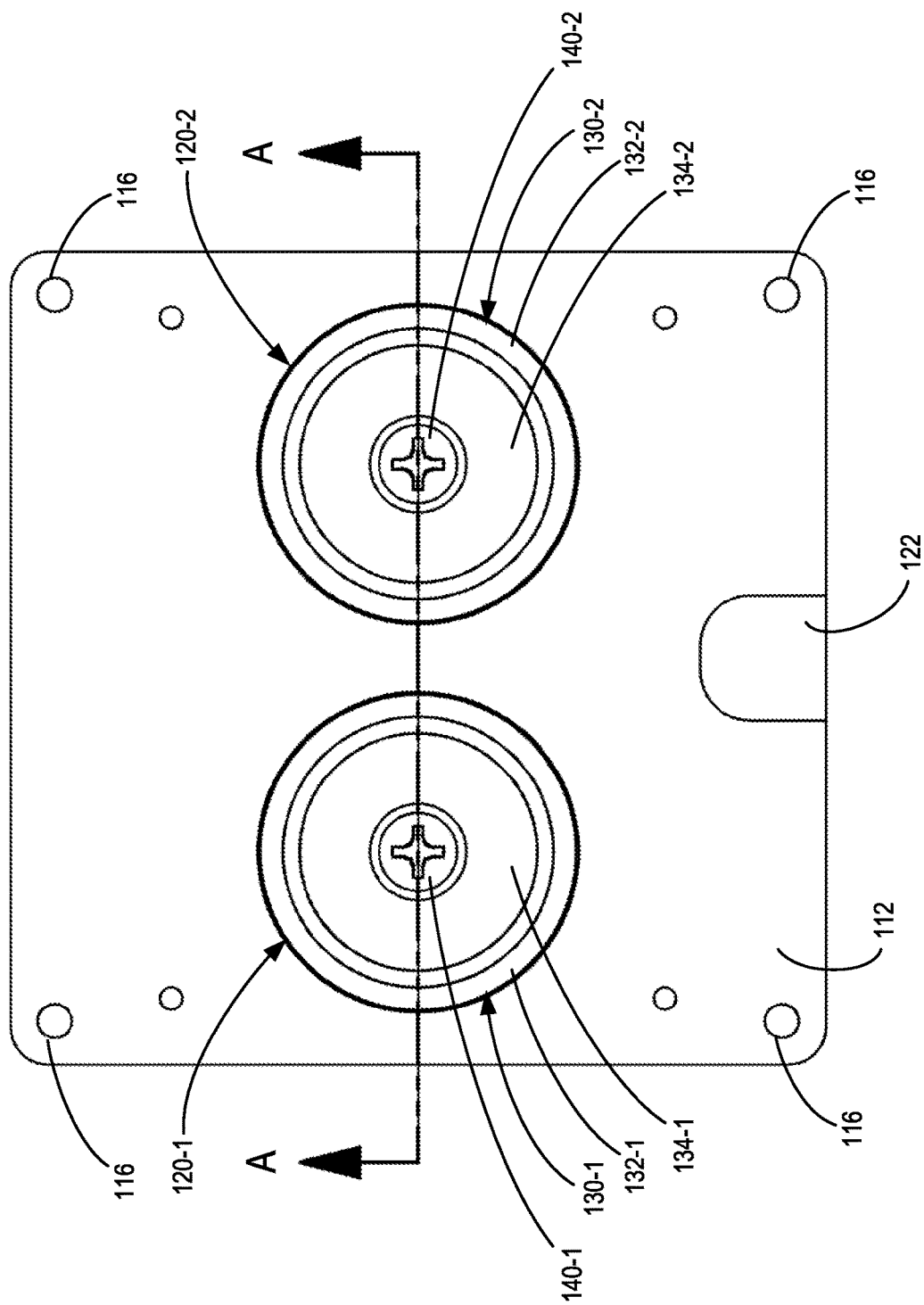
FIG. 4 is a rear view of the magnetic adaptor of FIG. 1.
Figure 5:
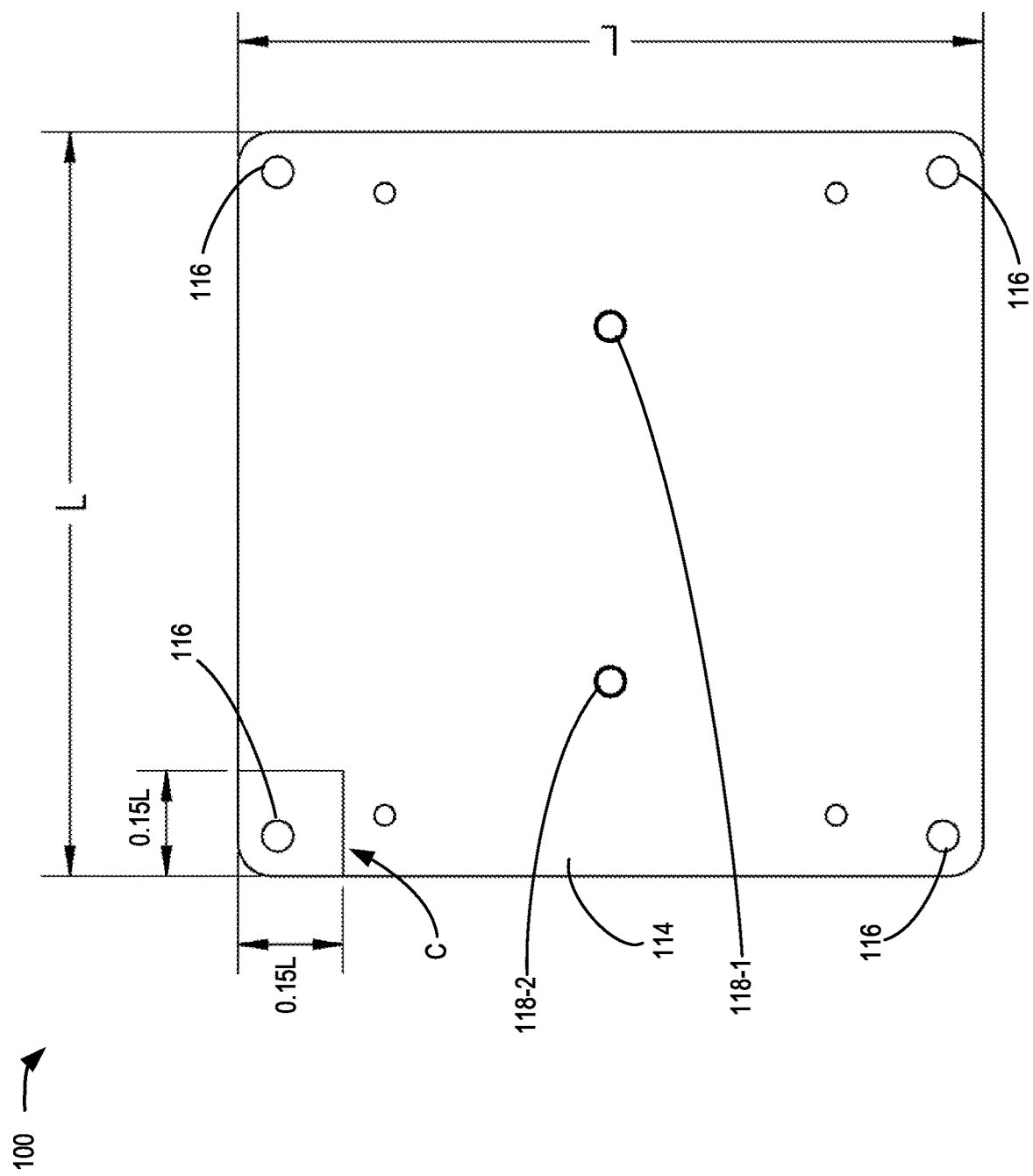
FIG. 5 is a front view of the magnetic adaptor of FIG. 1.

FIGS. 3-5 are a rear perspective view, a rear view, and a front view of magnetic adaptor 100. Magnetic adaptor 100 may include a mounting plate 110 and at least one magnetic disk 130 (shown as magnetic disks 130-1 and 130-2 in FIGS. 1-4). FIG. 6 is a side cross-section view of mounting plate 110 along section A-A of FIG. 4. FIG. 7A is a side view of magnetic adaptor 100. FIG. 7B is a side cross-section view of magnetic disk 130 along section A-A of FIG. 4. Referring collectively to FIGS. 1-7B, mounting plate 110 includes a rigid plate with a substantially parallel rear surface 112 and a front surface 114. Rear surface 112 may be configured to contact pump frame 20 (e.g., mounting surface 22 or another portion of pump frame 20). Front surface 114 may be configured to mate to a rear surface 14 (e.g., a flat or substantially flat surface) of monitoring device 10. Mounting plate 110 may be mechanically attached to monitoring device 10, and the rear surface 112 of mounting plate 110 may adhere to pump frame 20 due to the pull force of magnetic disks 130. When rear surface 112 is secured against pump frame 20, sensors in monitoring device 10 may detect pump indicators, such a vibration and temperature, via magnetic adaptor 100.

Mounting plate 110 may be formed from a non-magnetic material (e.g., austenitic stainless steel, aluminum, rigid plastic, etc.) or a magnetic material (e.g., ferritic stainless steel). The front/rear perimeter shape of plate 110 (e.g., FIGS. 4 and 5) may be generally similar to the perimeter shape of the rear surface 14 of monitoring device 10 (e.g., a square with rounded corners). In other embodiments, mounting plate 110 may have other perimeter shapes, such as rectangular, circular, oval, or an irregular shape. Mounting plate 110 may include threaded holes 116 at, for example, each corner of plate 110 and at least one recessed hole 118. In one implementation, holes 116 may extend through the thickness of mounting plate 100. According to an implementation, mounting plate 110 may have a thickness, T, of about 0.4 to 0.8 inches. Plate 110 may be attached to a rear surface 14 of monitoring device 10 using, for example, threaded mounting pins 30 (e.g., screws/bolts) inserted through a housing of monitoring device 10 and into mounting holes 116. In another implementation, holes 116 may open at front surface 114 and extend partially through the thickness of mounting plate 110 to prevent installed mounting pins 30 from extending beyond rear surface 112.

Mounting holes 116 in plate 110 may be configured to receive mounting pins 30 inserted through holes 12 of monitoring device 10. Mounting holes 116 may be configured in a pattern to align with the pattern of holes 12 in monitoring device 10. Particularly, in the examples shown, four mounting holes 116, each distributed in a corner of mounting plate 110, may be matched to four holes 12 of monitoring device 10. According to an implementation, at least four mounting holes 116 and corresponding mounting pins 30 (e.g., located near respective corners of plate 110) may be used to ensure vibration and thermal energy are effectively transmitted between magnetic adaptor 100 and monitoring device 10. In other implementations, other numbers of mounting holes 116 may be used (e.g., 2, 6, etc.).

As shown, for example, in FIG. 5, front surface 114 (and corresponding rear surface 112) includes a substantially square perimeter with each of mounting holes 116 located near a different corner of the substantially square perimeter. According to an implementation, each of mounting holes 116 may be positioned within an area, C, which may include the intersecting 15 percent of length L (e.g., 0.15L) along each side of the perimeter. In other implementations, mounting plate 110 may include additional mounting holes (e.g., holes 826, FIG. 8A) to accommodate different hole patterns for different types of monitoring devices 10.

In one implementation, mounting pins 30 may include threaded bolts that are separate from the housing of monitoring device 10. In another implementation, mounting pins 30 may be integrated into the housing of monitoring device 10. Mounting pins 30 may be inserted through holes 12 of monitoring device 10 and secured in mounting holes 116 to attach monitoring device 10 to magnetic adaptor 100.

Magnetic adaptor 100 may be configured to transfer thermal energy from pump frame 20 to the monitoring device 10, where sensors in monitoring device 10 may detect changes in surface temperature. According to one implementation, a monitoring device 10 attached to pump frame 20 via magnetic adaptor 100 may be calibrated differently for thermal sensing, to account for heat transfer through magnetic adaptor 100, than a monitoring device 10 that is directly attached to pump frame 20. Magnetic adaptor 100 may also transfer mechanical vibrations from pump frame 20 to monitoring device 10 for detection.

Mounting plate 110 may include one or more pockets 120 (shown as pockets 120-1 and 120-2 in FIGS. 1-6, also referred to as a "recess") that is machined into rear surface 112. Each pocket 120 may be configured to receive a magnetic disk 130 therein. In one implementation, a depth, H, of pocket 120 may correspond to the height of magnetic disk 130, and a diameter, D, of pocket 120 may correspond to a diameter of magnetic disk 130 (with nominal tolerances). According to another implementation, a pry slot 122 may also be machined into rear surface 112. Pry slot 122 may include an opening 123 along a perimeter of rear surface 112. Pry slot 122 may facilitate removal of magnetic adaptor 100 from pump frame 20, for example. For example, pry slot 122 may be configured to accommodate a tool, such as a flat-head screw driver or small pry bar. The orientation of pry slot 122 relative to monitoring device 10 may be adjusted during attachment of magnetic adaptor 100 to monitoring device 10. For example, depending on the mounting location and shape of pump frame 20, it may be preferable to orient pry slot 122 with opening 123 facing up, down, left, or right to permit access by the tool.

Magnetic disk 130 may include a magnet, such as a cup magnet, with sufficient pull capacity to hold the combination of monitoring device 10 and magnetic adaptor 100 securely against pump frame 20. The pull strength of magnetic disk 130 may be sufficient to prevent movement of monitoring device 10/magnetic adaptor 100 relative to pump frame 20 during pump operation. As a non-limiting example, magnetic disks 130 in combination may have a pull strength in the range of 90 to 180 pounds. For example, magnetic disks 130 may each have a 45-pound, 60-pound, or 90-pound pull capacity. Magnetic disk 130 may include, for example, a neodymium cup magnet with a thickness of approximately 0.2 to 0.3 inches (5 to 8 millimeters) and a diameter of 1.26 inches (32 mm). In some implementations, magnetic disk 130 may include a steel reinforcing cover 132, a magnet 134, and/or spacing material (not shown). According to an implementation, magnetic disk 130 may also include a hole 136 to receive a bolt 140 or screw therein. Bolt 140 may be inserted, for example, through a countersunk hole 132 of magnetic disk 130 and into a corresponding hole 118-1, 118-2 of plate 110. As shown in FIG. 3 and FIG. 7A, for example, each bolt 140, may secure a magnetic disk 130 in pocket 120 so that magnetic disk 130 and rear surface 112 are substantially flush. In another implementation, the exposed surface of magnetic disk 130 may protrude out of pocket 120 slightly beyond rear surface 112.

Heat transfer between pump frame 20 and monitoring device 10 may occur via mounting plate 110 and/or magnetic disks 130. According to one implementation, the material of mounting plate 110 (e.g., type 304 stainless steel) may provide similar thermal conductivity as the material(s) of magnetic disk 130 (e.g., neodymium and steel). According to another implementation, the material of mounting plate 110 (e.g., aluminum) may provide different thermal conductivity than the material(s) of magnetic disk 130 (e.g., neodymium and steel). The thickness of mounting plate 110 may be minimized to provide optimal and predictable heat transfer between pump frame 20 and monitoring device 10, while preventing installed mounting pins 30 from extending beyond surface 112 when monitoring device 10 is attached to mounting plate 110. Thus, according to an implementation, the thickness, T (FIG. 7A), of mounting plate 110 may not exceed 0.8 inches.

According to an implementation, magnetic adaptor 100 may be provided assembled with monitoring device 10 as factory supplied equipment. In other implementations, magnetic adaptor 100 may be provided as a retrofit component. For example, for pump frames 20 that have mounting holes configured to receive monitoring device 10, magnetic adaptor 100 may provide an alternative to repairing damaged/stripped threads in the mounting holes of pump frame 20.

Figure 8:
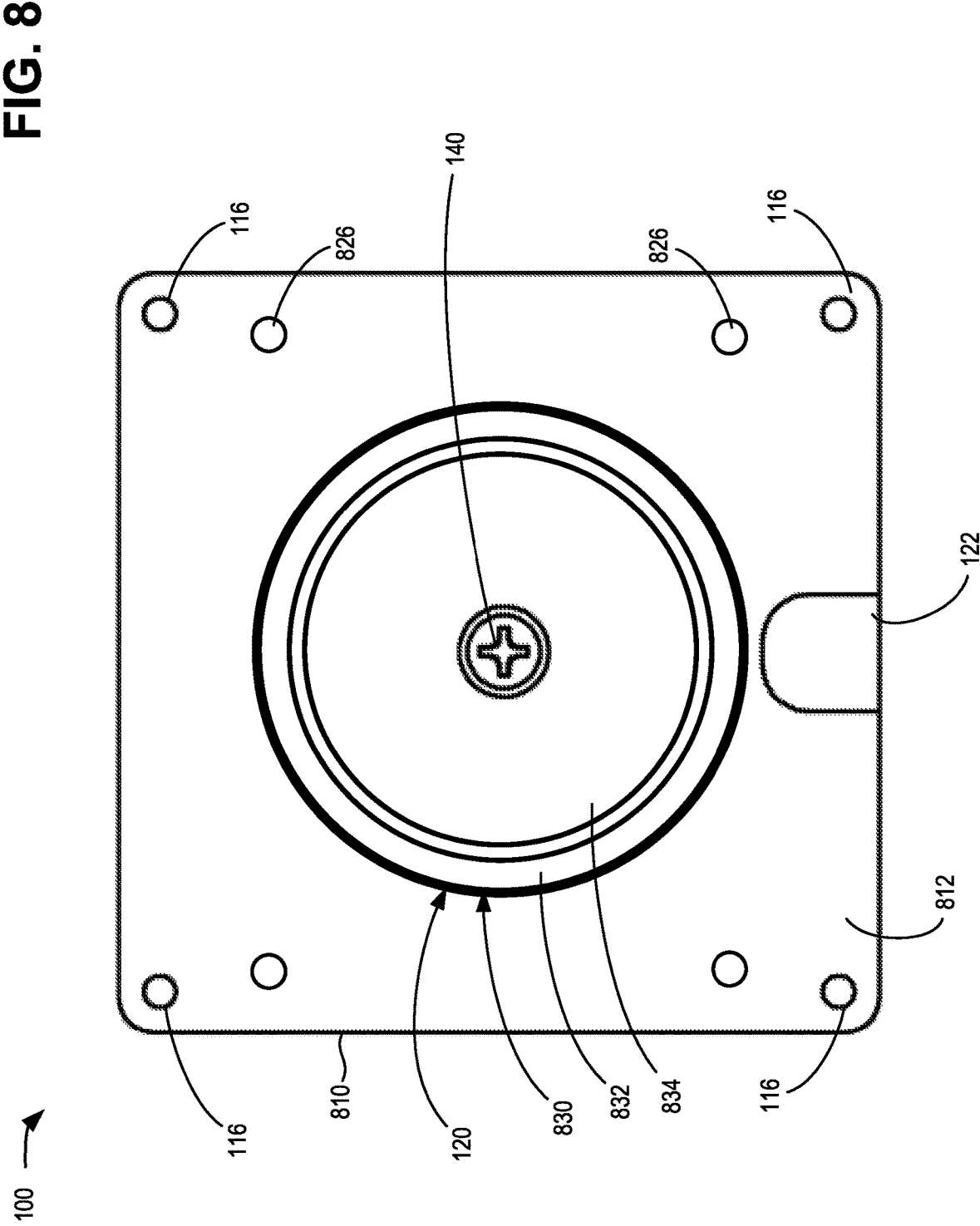
FIG. 8 is a rear view of a magnetic adaptor according to another implementation.

FIG. 8 is a rear view of magnetic adaptor 100 according to another implementation. Generally, in the configuration of FIG. 8, magnetic adaptor 100 may be configured to include a mounting plate 810 with one magnetic disk 830. Referring to FIG. 8, mounting plate 810 includes a rear surface 812 with a pocket 120 therein. Similar to configurations of mounting plate 110 described in connection with FIGS. 1-7B, rear surface 812 may be configured to contact pump frame 20 and the opposing front surface may be configured to match a rear surface 14 of monitoring device 10.

Mounting plate 810 may include different patterns of threaded holes 116 and 826. Threaded holes 116 may be located, for example, at each corner of plate 810 to match a pattern of holes of monitoring device 10. Threaded holes 826 may be located, for example, at different locations on plate 810 to match a different pattern of holes for a different type of monitoring device 10. Thus, mounting plate 810 may be configured to accept mounting pin patterns for multiple different types of monitoring devices (e.g., different sizes, different manufactures, etc.).

Mounting plate 810 may include one pocket 820 machined into rear surface 812. Pocket 820 may be configured to receive a magnetic disk 830 therein. As described above in connection with FIGS. 1-7B, pockets 120 may include a threaded hole 118 to receive a bolt 140 therein.

Magnetic disk 830 may include a magnet with sufficient pull capacity to hold the combination of monitoring device 10 and magnetic adaptor 100 securely against pump frame 20. For example, the pull strength of magnetic disk 830 may be sufficient to prevent movement of monitoring device 10/magnetic adaptor 100 relative to pump frame 20 during vibrations from pump operation (e.g., including any vibrations produced due to pump malfunctions). As non-limiting examples, magnetic disk 830 may have a 60-pound, 90-pound, or 120-pound pull capacity. In the implementation of FIG. 8, magnetic disk 830 may be secured to mounting plate 810 using threaded fasteners 140.

Figure 9C:
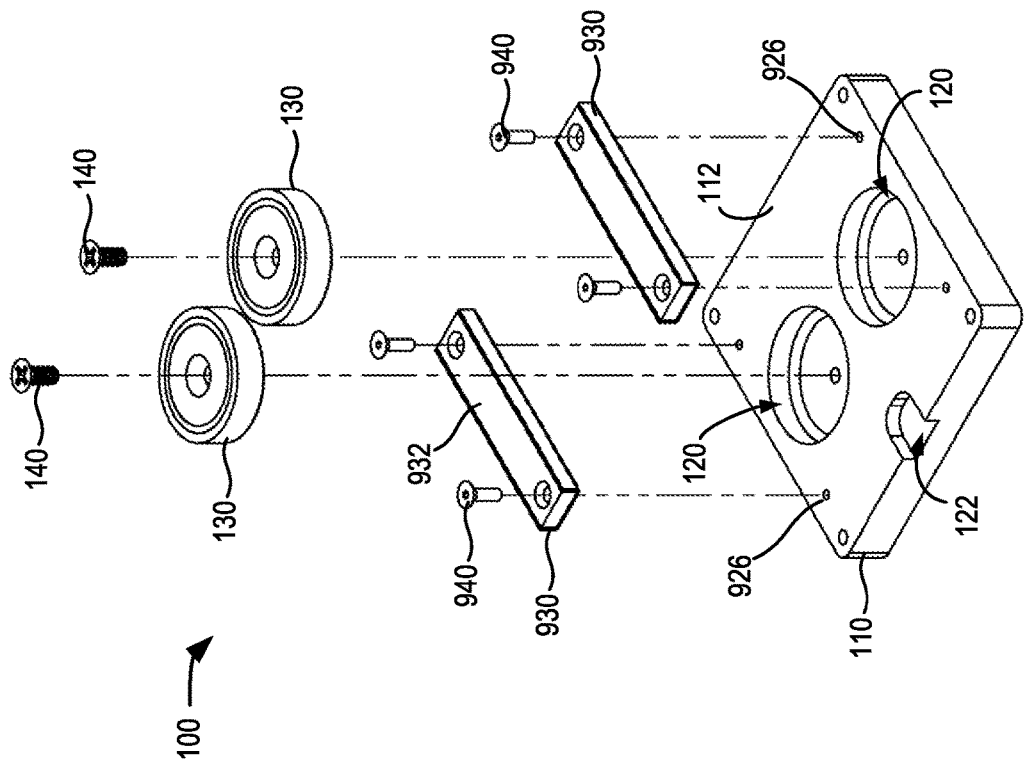
FIGS. 9A-9C are rear, side, and rear assembly views, respectively, of a magnetic adaptor according to still another implementation.
Figure 9A:
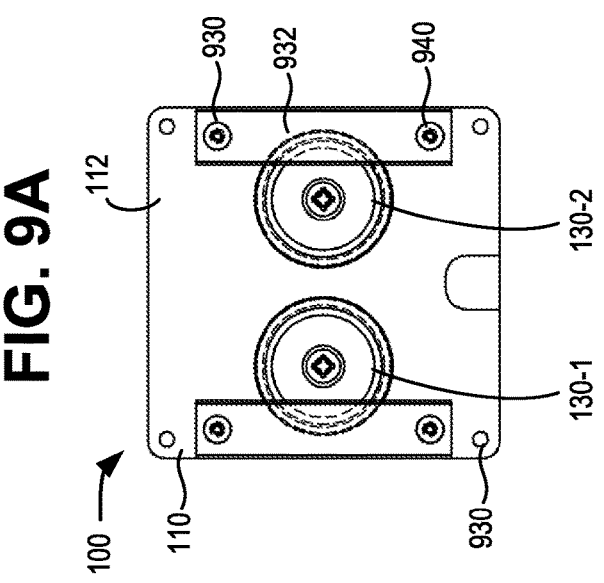
Figure 9B:
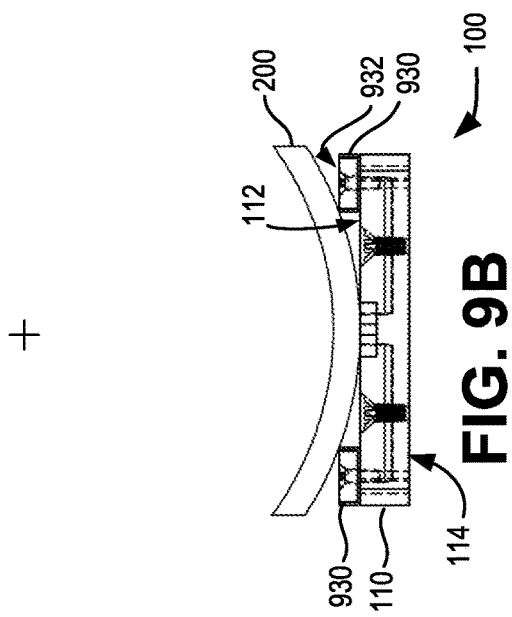

FIGS. 9A-9C are rear, side, and rear assembly views, respectively, of magnetic adaptor 100 configured according to another implementation. Generally, in the configuration of FIGS. 9A-9C, magnetic adaptor 100 may be configured with bar magnets 930 to accommodate mounting to a non-planar surface of pump frame 200. More particularly, magnetic adaptor 100 may be configured to adhere to a curved surface with bar magnets 930 aligned parallel to an axis of the adhered surface's radius of curvature (e.g., as shown in FIG. 9B).

As shown in FIG. 9C, mounting plate 110 may be configured with threaded holes 926 that open at rear surface 112 and extend at least partially into mounting plate 110. Bar magnets 930 may be secured to rear surface 112 of mounting plate 110 using threaded fasteners 940 inserted through bar magnets 930 into holes 926, for example. According to an implementation, bar magnets 930 (and a corresponding set of holes 926) may be positioned in parallel near opposite edges along rear surface 112. Bar magnets 930 may be installed instead of, or in addition to, magnetic disks 130.

In the configuration of FIG. 9A-9C, magnetic adaptor 100 may be attached to monitoring device 10 in a similar manner to that described above in connection with FIGS. 1-8. The orientation of bar magnets 930 relative to monitoring device 10 may be altered by rotating mounting plate 110 ninety degrees prior to attachment to monitoring device 10.

When mounted on mounting plate 110, bar magnets 930 may each have an exposed surface 932 that is in a different plane than rear surface 112. As shown, for example, in FIG. 9B, the different planes of surfaces 112 and 932 may allow for multiple points of contact, as both bar magnets 930 simultaneously contact pump frame 20 along two radially-spaced lengths of a curved surface of pump frame 20. Depending on the implementation, bar magnets 930 may have a same or different pull capacity than magnetic disks 830. For example, if bar magnets 930 are used with magnetic disks 830 (e.g., as shown in FIGS. 9A-9C), the pull strength of all four magnets 830/930 combined may be between about 90 and 180 pounds. According to an implementation, the magnetic adaptor 100 of FIGS. 9A-9C (e.g., with holes 926 in mounting plate 110, bar magnets 930 and threaded fasteners 940) may be provided to customers as a package that can be configurable on-site for selectively mounting to a flat or curved surface of monitored equipment.

A magnetic adaptor is provided for attaching a monitoring device to monitored equipment. A mounting plate of the adaptor includes a front surface, a rear surface, and a recess in the rear surface. A magnet is secured within the recess, such that an exposed surface of the magnet within the recess is substantially flush with the rear surface. The mounting plate also includes, for example, four threaded mounting holes arranged in a hole pattern that corresponds to a bolt pattern of the monitoring device. The threaded mounting holes are configured to receive threaded bolts from the monitoring device to secure the front surface against the monitoring device. The magnet is configured to adhere to the monitored equipment and cause at least a portion the rear surface to contact the monitored equipment. The adaptor transfers vibration and thermal energy from the monitored equipment to the monitoring device.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such.

What is claimed is:

1. An adaptor for a monitoring device, the adaptor comprising:
    a mounting plate including:
        a front surface,
        a rear surface,
        at least two threaded mounting holes extending through the front surface and rear surface, and
        at least one recess in the rear surface;
    one or more magnets secured within the at least one recess; and
    a pair of bar magnets mounted on the rear surface of the mounting plate in a parallel orientation,
    wherein the at least two threaded mounting holes are arranged in a hole pattern that corresponds to a bolt pattern of the monitoring device,
    wherein the at least two threaded mounting holes are configured to receive threaded bolts from the monitoring device to secure the front surface against the monitoring device,
    wherein the one or more magnets are configured to couple with a monitored equipment frame and cause at least a portion of the rear surface to contact the monitored equipment frame, and
    wherein the mounting plate is configured to transfer at least one of vibration or thermal energy from the monitored equipment frame to the monitoring device.

2. The adaptor of claim 1, wherein the mounting plate includes a ferrous metal material.

3. The adaptor of claim 1, wherein the mounting plate includes a non-ferrous metal material.

4. The adaptor of claim 1, wherein the mounting plate further comprises:
    a pry slot including an opening at a perimeter of the rear surface.

5. The adaptor of claim 1, wherein the one or more magnets are configured to provide a combined pull capacity within a range of 90 pounds to 180 pounds.

6. The adaptor of claim 1, wherein the mounting plate includes two recesses in the rear surface, with each of the one or more magnets secured within a corresponding recess of the two recesses.

7. The adaptor of claim 1,
    wherein an exposed surface of each of the bar magnets is in a different plane than the rear surface.

8. The adaptor of claim 1, wherein the front surface is parallel to the rear surface, and wherein the mounting plate has a thickness in a range of 0.4 to 0.8 inches.

9. A system comprising:
    a monitoring device configured to be mounted to equipment and collect vibration and temperature data from the equipment; and
    an adaptor for a monitoring device, the adaptor including:
        a mounting plate having a front surface, a rear surface, at least four threaded mounting holes extending through the front surface, and at least one recess in the rear surface,
        one or more magnets secured within the at least one recess, and
        a pair of bar magnets configured to be mounted in a parallel orientation on the rear surface of the mounting plate,
    wherein the at least four threaded mounting holes are arranged in a hole pattern that corresponds to a bolt pattern of the monitoring device,
    wherein the at least four threaded mounting holes are configured to receive threaded bolts from the monitoring device to secure the front surface against the monitoring device,
    wherein the one or more magnets are configured to couple with a frame of the piece of equipment and cause at least a portion of the rear surface to contact the frame, and
    wherein the mounting plate is configured to transfer vibration and thermal energy from the piece of equipment to the monitoring device.

10. The system of claim 9, wherein the mounting plate includes a non-ferrous material.

11. The system of claim 9, wherein the mounting plate further comprises:
    a pry slot including an opening at a perimeter of the rear surface.

12. The system of claim 9, wherein the one or more magnets are configured to provide a combined pull capacity within a range of 90 pounds to 180 pounds.

13. The system of claim 9, wherein the adaptor further comprises:

threaded holes at the rear surface that extend at least partially into the mounting plate, wherein the pair of bar magnets are configured to be mounted in a parallel orientation on the rear surface of the mounting plate using the threaded holes, and wherein an exposed surface of each of the bar magnets is in a different plane than the rear surface.

14. The system of claim 13, wherein the front surface of the adaptor is configured to attach to a flat surface of the monitoring device, and wherein the rear surface of the adaptor is configured to contact a curved surface of the equipment at multiple points.

15. The system of claim 9, wherein the rear surface includes a substantially square perimeter and wherein each of the at least four threaded mounting holes is located within a respective corner region of the substantially square perimeter.

\* \* \* \* \*